(No Model.)
C. J. A. PIGEON.
LAMP.
No. 316,481. Patented Apr. 28, 1885.
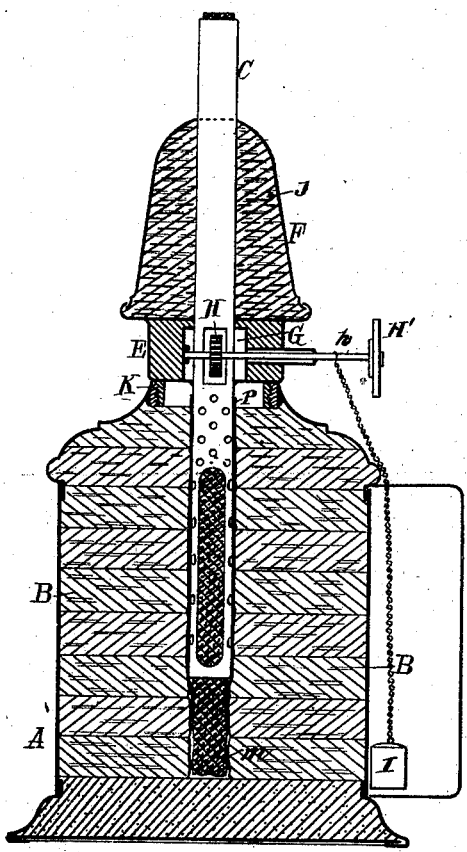
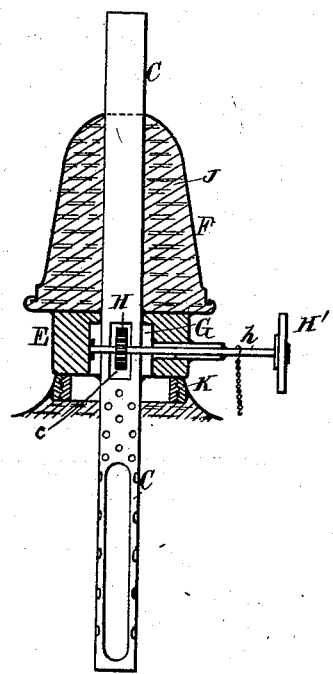
Witnesses:
Charles R. Searle,
J. E. Renwick
Inventor:
Charles Joseph A. Pigeon
by his attorney
Thomas D. Stetson

UNITED STATES PATENT OFFICE.

CHARLES JOSEPH A. PIGEON, OF PARIS, FRANCE.

LAMP.

SPECIFICATION forming part of Letters Patent No. 316,481, dated April 28, 1885.

Application filed September 4, 1884. (No model.)

*To all whom it may concern:*

Be it known that I, CHARLES JOSEPH A. PIGEON, of Paris, France, have invented certain new and useful Improvements in Lamps, of which the following is a specification.

The object is to better promote safety in the use of highly-inflammable materials, as the light products of petroleum. I hold the naphtha, kerosene, or other inflammable liquid absorbed in one or more uniformly-dense rings of felt or analogous material, which fills the body of the lamp uniformly, except the small space just sufficient for the wick-tube in the center. The wick-tube extends down nearly to the bottom, and is provided with openings in its sides, through which it presents the inclosed wick to absorb the fluid. I have also devised and practically applied increased safeguards against the conduction of heat from the flame down to the mass of inflammable liquid contained in the absorbent rings and in the lower portion of the wick.

The following is a description of what I consider the best means of carrying out the invention.

The accompanying drawings form a part of this specification.

Figure 1 is a central vertical section through a lamp containing my invention, ready for use. Fig. 2 is a corresponding section showing a portion of the lamp.

Similar letters of reference indicate corresponding parts where they occur in both the figures.

A is the body of the lamp, formed of sheet-brass or other suitable material.

B is a closely-fitted filling composed of flat disks of felt, each having a small cylindrical hole in the center sufficient to allow the passage of a small round wick-tube.

C is the wick-tube, extending up a sufficient height to allow a liberal quantity of non-conducting material around it above the body of the lamp, and extending downward nearly to the bottom of the lamp. A slot, *c*, allows the action of the regulating-wheel H against the wick *m*. The whole of that portion of the wick-tube C which extends down into the body of the lamp is provided with small perforations, and also with a large and long aperture, the latter exposing a considerable surface of the wick.

P is a close-fitting tube or jacket, made of that sort of flannel which has considerable filaments extending out like fur, sometimes known as "canton-flannel." It is arranged with the furry side inward.

The wick is controlled by turning the wheel H by a shaft, *h*, and button H', as usual. The wick-operating wheel is inclosed in a metallic box, G, only a little larger than the wheel. Between this box and the outer casing of the neck of the lamp is interposed a filling, E, of plaster or other hard material, which contributes to the strength of this portion of the lamp, while by its non-conducting qualities serving to defend the body of the lamp against the transmission of heat from above.

The wick-tube C extends up above the lamp-body farther than usual. The portion above the lamp-neck G E is surrounded by a top casing, F, of thin metal, inclosing a considerable quantity of felt, J, which forms a tolerably compact mass of non-conducting material. The upper portion of the casing F is contracted in diameter, as shown, allowing free access of air to the flame.

I propose in some cases to wet the filling J, and thus increase its capacity to resist the transmission of heat downward.

The wick *m* should be of sufficient length to extend quite to the bottom of the lamp. It is preferably upset or compressed endwise considerably, so as to be certain to extend quite to the bottom, even after the wick has been shortened by successive clippings of its upper end in trimming the lamp. The rigid wick-tube C, inclosing it nearly to the bottom, makes it practicable to thrust it down through the close-fitting hole in the felt rings B.

In the use of the lamp, the top with the wick-tube is removed by unscrewing, as usual, at the junction K, and the light petroleum, coal-oil, or other burning-liquid is poured in at the top until the absorbent material B is well filled. Then the top with the wick-tube is applied.

By reason of the extension of the wick-tube down nearly to the lower end of the wick, no difficulty is experienced in thrusting the wick down in the small aperture provided, and the parts are again screwed firmly together at K.

The lamp is lighted and used in all respects in the ordinary manner.

The felt J in the top portion and the plaster E in the neck serve as an efficient defense against the conduction of heat from the flame downward to the body.

Felt is cheap and elastic, allowing it to tightly fill the body of the lamp without special accuracy in forming the parts, and possesses the qualities of holding the petroleum or other inflammable liquid against spilling in case the lamp is broken or overturned, and of giving up the same at a proper rate by allowing it to be absorbed through the apertures in the wick-tube.

The flannel P, lying with its smooth side pressed tightly against the inner edges of the several felt rings B, and with its furry side inward, with its filaments projecting inward through the holes in C, insures a sufficient contact with the wick to conduct the liquid freely.

A cap, I, suspended by a chain, i, serves the usual function of a covering to fit on the top of the wick-tube and prevent the evaporation of the volatile liquid when the lamp is out of use.

Modifications may be made in the forms and proportions within wide limits. I can make the felt rings B from thinner felt, using a correspondingly-increased number, or I can use thicker felt, consequently requiring a less number.

The benefits of the invention may be attained in some degree by employing a single mass of felt properly shaped to fill the whole body of the lamp, always excepting the small hole in the center, adapted to fit closely to the wick-tube, or to the tightly-fitted tube P, of fibrous material, which surrounds it.

The lamp may be used for burning various fluids for producing light, or for producing heat for cooking, or for various other purposes.

What I have termed "felt" may be made in great part or in whole of the fur or the hair of animals, which has not in any high degree the property of felting, so as to give the strength which is necessary for many of the uses to which felt is applied. I prefer, however, those constructions of hair and wool which are capable of felting, and which have been worked by hand or by machinery, so as to knit together with all the firmness required for piano-felt.

I prefer to introduce the ring or rings of felt during the manufacture of the lamp.

I claim as my invention—

1. In a lamp, the combination, with the body and contained rings of felt or analogous absorbent material, of a perforated wick-tube arranged centrally, and a textile tube closely fitted between said rings and tube, as set forth.

2. In a lamp, substantially as described, the combination, with rings of absorbent material, as B, and a perforated wick-tube, C, of a tube of flannel or the like, having one side provided with a furry surface, and arranged between the rings B and wick-tube, with portions of the furry side projecting into the perforations of said wick-tube, as and for the purposes set forth.

3. The wick-tube C, perforated as shown, in combination with the close-fitting capillaceous tube P, and with the absorbent rings B and body A, as herein specified.

In testimony whereof I have signed this specification in the presence of two subscribing witnesses.

CHARLES JOSEPH A. PIGEON.

Witnesses:
ROBT. M. HOOPER,
C. CRÉMERS.